Patented Aug. 25, 1936

2,052,358

UNITED STATES PATENT OFFICE 2,052,358

HONEY WHIP

Albert A. Lund, Port Washington, N. Y.

No Drawing. Application March 31, 1933, Serial No. 663,858

3 Claims. (Cl. 99—146)

This invention relates to improvements in honey products and more particularly to whipped or aerated honey products and includes methods of preparing the same.

Prior attempts to produce commercial whips or toppings of this character, consisting essentially of honey, have invariably met with failure, owing to the extreme susceptibility of such products to syneresis or separation. A period of eight to ten days is ordinarily sufficient to bring about a noticeable degree of separation, the jelly structure of the whip breaking down as the whipping agent releases part of its moisture or syrup, the syrup coalescing into pools of clear liquid and ultimately settling out at the bottom of the container. These prior products become further characterized by an extreme coarseness in texture, an unpleasant appearance and a lack of palatability.

This invention has for an object to provide an improved honey whip product which avoids the above defects common in prior art products and which in fact possesses relatively permanent stability and keeping qualities.

An important object of this invention is to provide an aerated honey product that is firm, moldable and form-retaining; and yet which may be readily softened and made spreadable by slight warming.

A further object is to provide a product essentially comprising pure honey, together with minor necessary additions of whipping and/or stabilizing agents, which conforms to the dietetic requirements for pure honey products and which is free from adulteration with non-honey sugars.

Briefly stated, the outstanding structural characteristic of my improved product is the formation within the whip of an adsorption interface comprising the extended surface area of a submacroscopic dextrose hydrate crystal phase. It is this structure which, I have discovered, will restrain and, under certain conditions, altogether prevent, the tendency of the honey whip to separate. My theory of the mechanism of this action is that the syrup released by the synerizing colloid is promptly adsorbed on the adjacent crystal surfaces in satisfying the residual forces of adhesion exerted by the unsatisfied ends of the sugar's surface molecules, and, if the solid interface is sufficiently extensive, sufficient of the free syrup is adsorbed to prevent its migration and subsequent coalescence into pools or syrup layers until eventually an equilibrium is established between the adsorptive capacity of the crystals and the hydration capacity of the colloid.

The success of this anti-separating action depends upon the magnitude of the adsorptive force exerted by the sugar crystals, and this in turn is determined by the total surface area which these crystals present. The smaller these crystals are, the greater the total area of their external surfaces and, consequently, the greater their syrup-binding capacity. The crystal phase formed in the honey must, therefore, be exceedingly fine to prevent separation and this serves the ends of taste and palatability as well.

As hereinbefore stated, this invention comprises a whipped or aerated product in which a very definite state of crystallization of the honey is essential. The whipping or aerating operation follows after the desired crystallization has been reached and, as an aid thereto, I provide a surface tension depressant, preferably an albumen solution or other foam stabilizing or jellying agent which is mixed with the honey during the whipping thereof. The above stabilizing agents serve to lower the surface tension of the honey, facilitate the occlusion of air and help in producing a gel structure. If desired, instead of albumen, air or carbon dioxide or nitrogen gas, or the like, may be introduced as a whipping aid to the crystallized honey during the whipping operation.

The physical characteristics of the admixed whipped crystallized honey and the above stabilizing and/or aerating agents do not, however, possess any substantial degree of structural rigidity and, to aid in producing this necessary structural rigidity, I employ an auxiliary colloid or stabilizer, such as pectin, which will surround the air bubbles with relatively firm and tough cell walls of gelled syrup. Pectin takes some time to set and during this time, the albumen, gas, or other agent above referred to, is necessary to effect the proper air occlusion. The tough cell walls of gelled syrup which the pectin provides substantially prevent the air bubbles breaking through, under compression or deformation as in decorating, whereas the relatively weak cell walls of an albumen gel alone do not.

Referring more in detail to the crystallization phase, it is essential that the extent and adsorptive capacity of the solid phase be sufficient to bind a substantial portion of the free syrup released by the synerizing colloid as to substantially interfere with its mobility. I have found that the size of the crystals having these necessary characteristics is ordinarily less than 40–50 $\mu$ and preferably less than 15–20 $\mu$. It is obvious, of course, that the crystallizing operation must be subject to relatively minute regulation and that a general uncontrolled, or wholly spontaneous crystallization will not be satisfactory. Any suitable means of inducing this very fine crystallization may be employed, but my preferred method comprises creaming the unheated liquefied honey by seeding and agitating vigorously at a moderately low temperature until as much of the supersaturated sugar as possible is precipitated. During the creaming the honey is cooled to preferably 55° F. to 60° F., at which temperature the crystallization proceeds most rapidly and agitation of the magma proceeds vigorously for the purpose of further accelerating the crystallization and to prevent the formation of the undesirable relatively coarse crystals or crystal aggregates which occur in ordinary grained honey. The honey is seeded generously, preferably to the extent of 5 to 10% of its volume with very fine honey dextrose hydrate crystals, preferably from a previously creamed batch.

It is possible, of course, to seed the whip directly and thus avoid the preparation of a separate creaming batch, but in this case, it is difficult to judge when a crystal phase of sufficient surface area has been formed in the whip or to prevent the whip from breaking down due to excessive agitation before the more time consuming crystallization is completed. Also, the colloidal whipping and stabilizing materials in the proportions used, function as crystallization repressants and greatly delay, if they do not altogether prevent, the required crystallization.

It is evident from the foregoing that the success of my novel method of overcoming separation in whipped honey products depends in great measure upon the composition of the honey or honeys used in preparing the same. Obviously, the higher the ratio of dextrose to levulose, the more readily the product can be made to form the desired crystal phase. I therefore prefer to use honeys such as clover honey which, in addition to possessing a relatively high proportion of dextrose, also possesses a desirable and pleasing flavor. The honey selected should possess a moisture content which is not in excess of 20% and preferably not in excess of 18%. I also contemplate, and it is often desirable, to blend with such crystallizing honeys small proportions of other possibly non-crystallizing honeys of distinctive aroma and flavor. Where the honey to be used in preparing the whip is initially granulated, it must, of course, be liquefied to dissolve the coarse crystals before commencement of creaming.

The effectiveness of the colloids used in the product is largely determined by the completeness with which they are hydrated and the hydration of difficultly soluble colloids, such as pectin, in a dense medium like honey presents considerable difficulty. I have found that a relatively complete hydration of such materials may be accomplished by preparing strong solutions of the same by pressure cooking and adding the autoclaved solution to the honey in place of the dry material. In the case of pectin, for example, I take a standardized 100 grade citrus pectin, add water sufficient to produce a 10 to 20% pectin solution, place in a sealed vessel in an autoclave and cook to a pressure approximately 20 pounds.

Where it is desired to use albumen in place of gas as the initial aerating agent, I prefer to make the albumen up separately to a 30% solution without the application of heat and place this solution together with the pectin solution in a beater and whip to a froth preparatory to the gradual addition of the creamed honey batch.

The following is a preferred specific example of the method which this invention contemplates:

Select 100 pounds of Western Clover honey of approximately 82% solids (averaging several lots of honey if necessary to obtain this result) and completely liquefy, either by careful heating at not to exceed 130°–140° F., or by storing the honey in a hot room for several days. Now cool the completely liquefied honey to a temperature of from 55° F. to 65° F. This can be accomplished by transferring the honey to a refrigerator or cold room just prior to use and allowing it to come to this temperature before using, or the cooling process may be facilitated by placing the honey on a cold water or brine jacketed beater bed equipped with mechanical scrapers to facilitate the heat transfer. Unless moving scrapers are provided in this and the succeeding operation, the cold viscous honey tends to form an insulating film on the sides or bed of the beater, which effectively prevents the honey from being cooled properly by the beater jacket. As a result, the heat of friction and crystallization generated within the honey raises the temperature of the mass to a point where it is impossible to obtain a satisfactory crystallization.

The creaming or crystallizing operation is now performed in cold water or brine jacketed beater with mechanical scrapers such as that described. Add 5% of fine hydrate dextrose seed crystals, preferably from a previous creaming batch, and beat or cream vigorously for approximately 20 minutes, or until a generous deposit of new crystals may be observed under the microscope.

Prepare separately 3⅓ pounds of a 30% solution of egg albumen of prime beating quality, and 3 pounds of an autoclaved 10% solution of 100 grade citrus pectin. Slowly add these solutions to the creamed batch while whipping in a marshmallow beater and continue whipping until the desired over-run or weight-volume ratio is obtained. I consider an overrun of 100% to be most desirable for my purpose and to obtain this approximately 20 minutes of beating are ordinarily required. Pour the whip at once into containers and store in a cool place for several days to complete the fine deposition of crystals and bring about the set or rigidity of structure required for moulding or decorating purposes.

It is understood that the foregoing formula is illustrative only and that wide variations may be made in the disclosure herein given without departing from my concept of the invention.

I claim:

1. An aerated honey food product comprising finely crystallized honey and small amounts of albumen and pectin.

2. A process of preparing a honey food product which comprises finely crystallizing liquid honey, mixing therewith small amounts of albumen and pectin and aerating the mixture.

3. A process of preparing a honey food product which comprises finely crystallizing liquid honey, mixing therewith a solution containing albumen and pectin and simultaneously aerating the mixture.

ALBERT A. LUND.